Nov. 25, 1958     W. D. HARRISON     2,861,457

WINDSHIELD WIPER ACTUATING MECHANISM

Filed June 7, 1954     3 Sheets-Sheet 1

INVENTOR.
WALTER D. HARRISON
BY
George H. Strickland
HIS ATTORNEY

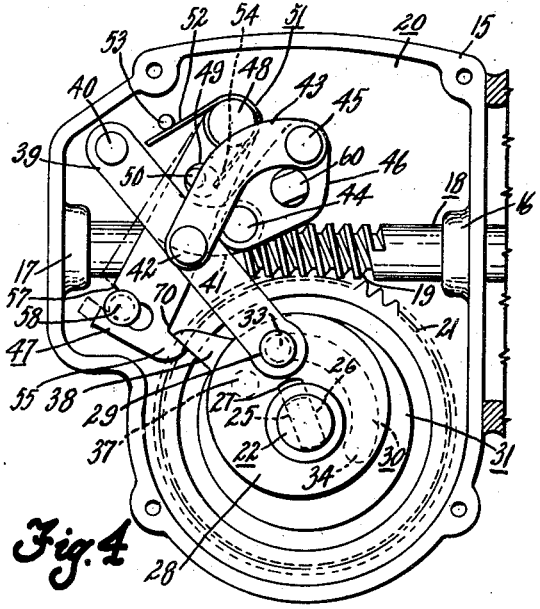

Nov. 25, 1958 W. D. HARRISON 2,861,457
WINDSHIELD WIPER ACTUATING MECHANISM
Filed June 7, 1954 3 Sheets-Sheet 3
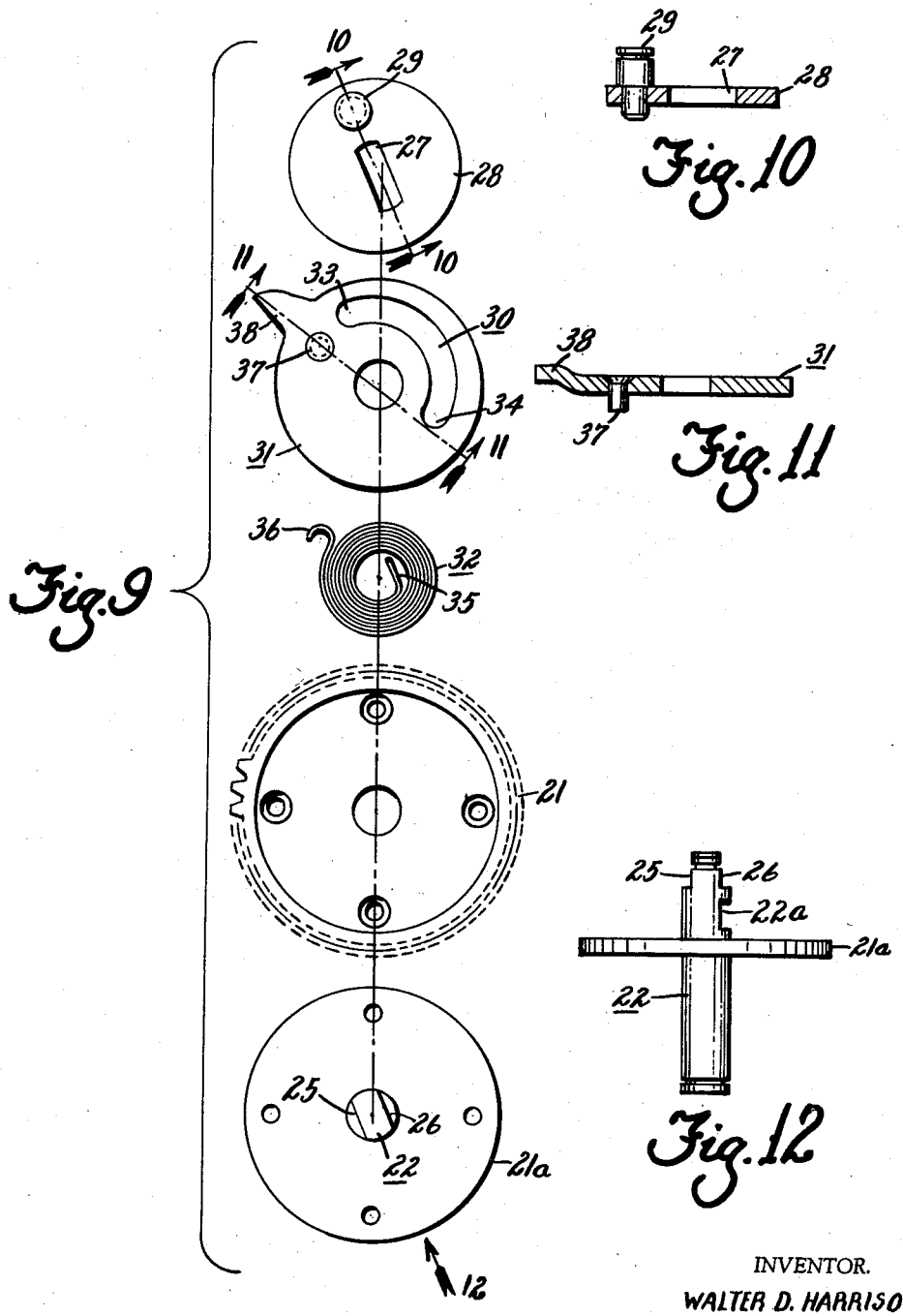
INVENTOR.
WALTER D. HARRISON
BY
George H. Strickland
HIS ATTORNEY United States Patent Office 2,861,457
Patented Nov. 25, 1958

2,861,457

WINDSHIELD WIPER ACTUATING MECHANISM

Walter D. Harrison, Rochester, N. Y., assignor to General Motors Corporation, Detroit, Mich., a corporation of Delaware Application June 7, 1954, Serial No. 435,012

9 Claims. (Cl. 74—75)

This invention pertains to a mechanical movement, and particularly to mechanism for converting rotation to oscillation including means for varying the amplitude of oscillation imparted to a driven member which may be used to actuate windshield wipers.

Heretofore, mechanical movements have been designed for converting rotation to oscillation including means for varying the amplitude of oscillation imparted to a driven member. Moreover, devices of this type have been driven by electric motors and used to actuate vehicle windshield wipers. However, one of the principal difficulties with prior mechanical movements resides in the fact that the oscillatory movement imparted to the driven member is not harmonic, or sinusoidal, in character. That is, the oscillatory member does not have a maximum speed at the center of the oscillatory stroke, and a minimum speed at the ends of the oscillatory stroke, but, conversely, is of a character generally having faster movement at the ends of the stroke than at the center thereof. This phenomenon is caused by the inherent operation of all cranks, and results in undesirable over-traveling of the wiper blades at the end of their strokes due to inertia and momentum. Accordingly, among my objects are the provision of a mechanical movement for converting rotation to oscillation including means for producing harmonic movement of an output member; the further provision of windshield wiper actuating mechanism including means for automatically increasing the amplitude of oscillation so as to park the wiper blades against the cowl of a motor vehicle; the further provision of actuating mechanism driven by an electric motor including safety means for preventing inadvertent stalling of the motor; and the still further provision of electric motor driven actuating mechanism including self-generative dynamic braking means for arresting motor rotation substantially instantaneously with movement of the blades to the parked position.

The aforementioned and other objects are accomplished in the present invention by incorporating a linkage which effects oscillatory movement of a driven member having a maximum speed at the center of the oscillatory stroke, and a minimum speed at the ends of the oscillatory stroke. Specifically, the actuating mechanism includes a unidirectional electric motor operatively connected to a shaft, or driving member, upon which a driven element is rotatably journaled and yieldably coupled thereto through a torsion spring. The motor driven shaft has rotatably connected thereto a crank arm capable of radial movement relative thereto so as to vary the crank arm length, or throw. The crank arm carries a crank pin which is received in a cam slot in the driven element, the cam slot being of varying radius, the general arrangement being of the type disclosed and claimed in copending application, Serial No. 221,048, filed April 14, 1951, in the name of A. G. Lautzenhiser, et al., now Patent #2,749,498.

The crank pin is pivotally connected to one end of a swinging connecting rod, or pitman arm, the other end of which is pivotally connected to one end of a link. The intermediate portion of the connecting rod is pivotally connected to the end of a second link, the two links being crossed and having their other ends pivotally connected to the ends of a rocker arm. The intermediate portion of the rocker arm is connected to a shaft which constitutes the driven member. Inasmuch as it is well recognized that the movement of a rotatable crank is not harmonic, the ends of the crossed, or twin, links, are spaced unequal distances from the axis of the driven shaft. The linkage is of a geometry so as to correct for the crank distortion and produce harmonic, or sinusoidal, oscillatory movement of the driven member.

In order to vary, or more particularly, to increase the amplitude of oscillation imparted to the output member, the actuating mechanism includes means for effecting relative movement between the driven element and the motor shaft so as to wind up the torsion spring and effect outward radial movement of the crank arm. In the present invention, this is accomplished by means of a movable latch arm which may be positioned so as to engage the driven element and restrain rotation thereof while the motor driven shaft continues to rotate. The latch arm also includes safety means for releasing the driven element in the event the motor is not deenergized at the proper time.

The driven member carries a crank arm arranged to actuate a parking switch only when the amplitude of oscillation is a maximum. The parking switch and self-generative braking system for the motor are of the type disclosed in copending application, Serial No. 418,503, filed March 25, 1954, in the name of R. H. Sullivan. Thus, when the manually operable control mechanism in moved to the "off" position, the blades will automatically be moved to the "parked" position and the motor will be dynamically braked substantially concurrently therewith.

Further objects and advantages of the present invention will be apparent from the following description, reference being had to the accompanying drawings wherein a preferred embodiment of the present invention is clearly shown, and wherein similar reference characters denote similar parts throughout the several views.

In the drawings:

Fig. 4 is a view similar to Fig. 1 with the actuating mechanism and the driven member in the "parked" position.

Fig. 5 is a view, partly in section and partly in elevation, taken along line 5—5 of Fig. 2.

Fig. 6 is a fragmentary sectional view taken along line 6—6 of Fig. 3.

Fig. 7 is a fragmentary sectional view taken along line 7—7 of Fig. 3.

Fig. 8 is a schematic electrical diagram illustrating the circuit connections for the windshield wiper motor.

Figure 9 is an exploded view in elevation, of the component parts of the crank assembly in the parked position. Figures 10 and 11 are sectional views taken along lines 10—10 and 11—11 respectively, of Figure 9. Figure 12 is a view in elevation taken in the direction of arrow 12 of Figure 9.

Figure 1:
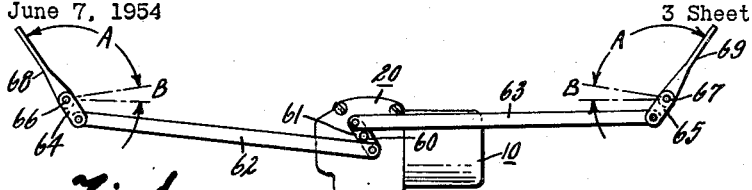
Fig. 1 represents a diagrammatic view of the actuating mechanism of this invention in combination with blades and linkages.

With particular reference to Fig. 1, a windshield wiper assembly is shown including a unidirectional electric motor 10, which is drivingly connected with motion converting mechanism 20 having an oscillatory output shaft, or driven member, 60. The driven member 60 is shown schematically connected to a double crank 61, opposite ends of which are pivotally connected to a pair of links 62 and 63, the other ends of which are pivotally connected to rocker arms 64 and 65, respectively. The rocker arms 64 and 65 are, in turn, connected to shafts 66 and 67 to which wiper arms 68 and 69 are attached. Thus, during oscillatory movement of the shaft 60, oscillatory movement will be imparted to the wiper arms 68 and 69, which, in a conventional manner, are arranged to carry wiper blades, not shown. The motion converting mechanism 20, as will be described more particularly hereinafter, is capable of imparting oscillation to the arms 68 and 69 throughout a wiping stroke A and may be adjusted so as to increase the amplitude of oscillation to an angle of A+B so as to move the wiper blades to a parked position against the cowl of a motor vehicle, not shown.

With reference to Figs. 2 through 4, and 9 through 12 the mechanical movement, designated generally by the numeral 20, includes a worm gear, or wheel, 21, which is drivingly associated with a worm 19 formed on a portion of a shaft, or driving member, 18, which is journaled by bearing means 16 and 17 within a housing 15. The shaft may be integral with, or suitably attached to, the armature 14 of the unidirectional, D. C. electric motor 10. Thus, it will be appreciated that upon rotation of the armature 14 and the shaft 18, rotation will be imparted to the gear 21, the gear 21 being connected to a plate 21a suitably attached to a shaft 22, which is supported by bearing means 23 and 24 within the housing 15, as shown in Fig. 5.

The free end of the shaft 22 is formed with flats 25 and 26, the flats being received in an elongated, complementary slot 27 formed in a crank arm, or element, 28, which is capable of radial movement relative to the shaft 22. It should be noted however that the crank arm 28 is at all times connected to rotate with the shaft 22 and, hence, with the worm gear 21. The crank arm 28 carries a crank pin 29, one end of which is received in a cam slot 30 of varying radius, the cam slot 30 being formed in a driven element, or cam element, 31, which is rotatably journaled on and yieldably connected to the driven shaft 22 through a torsion spring 32, as shown in Fig. 5.

Figure 2:
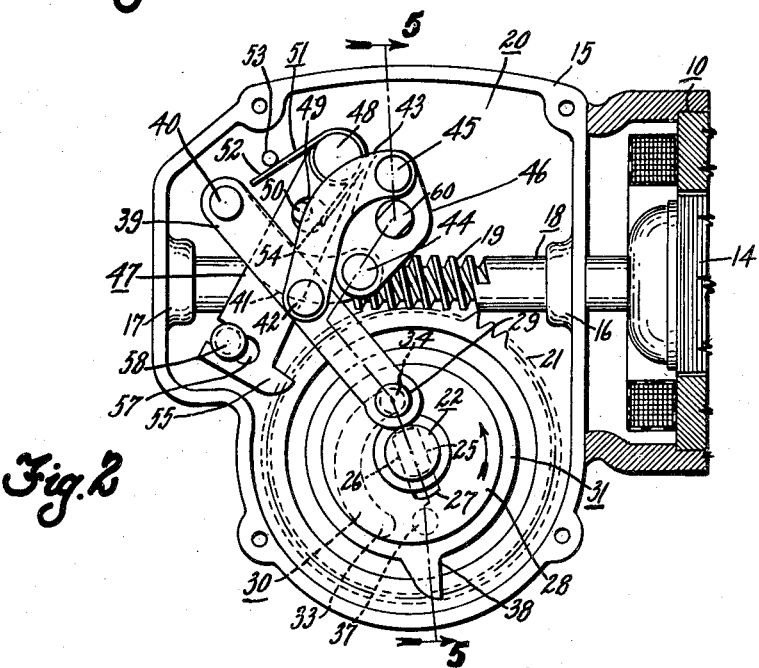
Fig. 2 is a fragmentary view, partly in section and partly in elevation, of actuating mechanism constructed according to this invention, with the driven member shown at one end of its normal oscillatory stroke.
Figure 3:
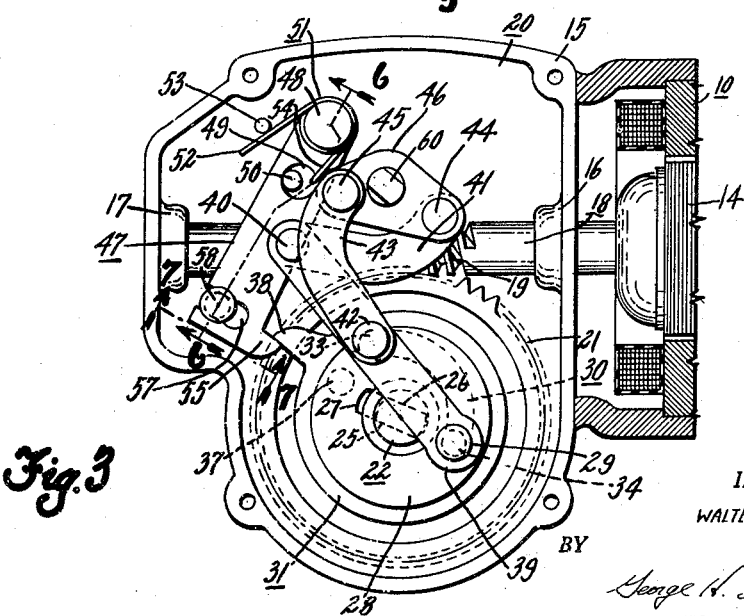
Fig. 3 is a view similar to Fig. 2 with the driven member shown at the other end of its normal oscillatory stroke.

From an inspection of Figs. 1 through 3, it is apparent that the radial distance of end 33 of the slot 30 from the axis of shaft 22 is greater than the radial distance of slot end 34. Thus, it may be said that the crank arm 28 and the driven element 31 are interconnected through a lost motion mechanism comprising cam slot 30 and crank pin 29. One end 35 of the torsion spring 32 is attached to a flat 22a formed on the shaft 22, and the other, or outer end 36 is suitably connected to a lug, or screw, 37, which is carried by the driven element 31. As alluded to hereinbefore, the general arrangement of the variable crank throw mechanism is of the type disclosed in the aforementioned copending application, Serial No. 221,048, now Patent No. 2,749,498. Thus, when the crank pin 29 is situated in the end 34 of the cam slot 30, the crank arm has a minimum length, and this relationship exists during the normal operation of the mechanism, since the torsion spring 32 normally maintains the crank pin 29 in the end 34 of the slot 30. When the crank pin 29 is moved to the end 33 of the slot 30, as shown in Fig. 4, the length of the crank arm 28 is increased by an amount equal to the difference in the radii between ends 33 and 34 of the slot 30. The increased length of the crank arm necessarily increases its throw so that oscillation of a greater amplitude is imparted to the driven member 60, as will be pointed out more particularly hereinafter.

The driven element 31 is also formed with a peripheral abutment, or lug, 38, the purpose of which will be described hereinafter. The crank pin 29 is pivotally connected to one end of a connecting rod 39, the other end of which is pivotally connected at 40 to a link 41 of arcuate configuration. The intermediate portion of the connecting rod 39 is pivotally connected at 42 to a second link 43 of arcuate configuration, the links 41 and 43 being crossed and having their other ends pivotally connected at 44 and 45, respectively, to the ends of a rocker arm 46. An intermediate portion of the rocker arm is rotatably connected to the shaft, or driven member, 60. Inasmuch as the shafts 22 and 60 are interconnected through a linkage constituted by the crank arm 28, the connecting rod 39, the two links 41 and 43, and the rocker arm 46, and in view of the fact that the length of the crank arm may be varied, it may be said that the linkage aforedescribed is of variable length depending upon the radial distance of the crank pin 29 from the axis of shaft 22.

It should be noted that the shaft 60 is connected to the rocker arm 46 at unequal distances from the pivotal connections 44 and 45 of the rocker arm with the two links 41 and 43, respectively. This geometry is utilized to correct for the distortion produced by the crank arm 28 so as to effect harmonic, or sinusoidal, movement of the driven shaft 60. In other words, the geometry of the linkage is designed so that the shaft 60 will have an oscillatory movement wherein the maximum speed will occur at the center of the oscillatory stroke and the minimum speed will occur at the ends of the oscillatory stroke. Accordingly, the wiper blades will have a minimum speed at the ends of their strokes where the reversal of movement occurs. In this manner, undesirable over-travel of the blades will be obviated. Thus, upon swinging movement of the connecting rod 39, as effected by rotation of the crank arm 28, the shaft 60 will have imparted thereto a maximum speed when the two links 41 and 43 are substantially symmetrically crossed, which relationship will occur when the connecting rod is in an intermediate position between that shown in Figs. 2 and 3. However, when the ends of the links 41 and 43 are located unequal distances from the connecting rod 39, as shown in Figs. 2 and 3, the shaft 60 will move at its slowest speed in relation to the speed of movement of the connecting rod 39. Inasmuch as this relationship obtains when the wiper blades are at the ends of their strokes and during reversal of their movement, it will be appreciated that over-travel of the wiper blades will be minimized.

When the shaft 60 is in its central position, half-way between the positions depicted in Figs. 2 and 3, the links 41 and 43 are substantially symmetrically crossed with the pivot points 44 and 45 substantially the same distance from the connecting rod 39. The variation in the speed of movement of the shaft 60, i. e. slowly at the ends and more rapidly in the middle, is caused by the varying positions of the links 41 and 43. When the links 41 and 43 are symmetrically crossed, the shaft 60 moves at the highest speed in relation to the movement of the connecting rod 39. However, when the pivot pin 44 of the link 41 is closest to the connecting rod 39 and the pivot pin 45 of the link 43 is farthest for the connecting rod 39, as depicted in Fig. 2, the shaft 60 will move at the slowest speed in relation to the movement of the rod 39, which is substantially uniform. Similarly, when the pivot pin 45 is closest to the connecting rod 39 and the pivot pin 44 is farthest from the rod 39, as depicted in Fig. 3, the same slow speed will be imparted to the shaft 60.

The motion converting mechanism also includes a latch arm 47, one end of which is supported for pivotal movement about a universal pivot 48, which is carried by the housing 15. An intermediate portion of the latch arm 47 is formed with a stop opening 49 within which a stop pin 50 carried by the housing 15 is received. In addition, the pivot 48 is encompassed by turns of a torsion spring 51, one end 52 of which abuts a stop pin 53 carried by the housing, and the other end 54 of which is situated in the opening 49. The spring 51 normally resiliently biases the latch arm 47 in a counterclockwise direction about the pivot point 48 to the position shown in Figs. 2 through 4. The free end of the latch arm 47 is formed with a lug, or abutment, 55, which is arranged to be positioned in the path of movement of the driven element 31 so as to engage the lug 38. In this manner, rotation of the driven element 31 may be restrained while the crank arm 28 rotates relative thereto so as to increase the length of the crank arm due to movement of the crank pin 29 from the end 34 of the slot 30 to the end 33 thereof. The latch arm 47 is also formed with a slot 57 within which a pin 58 is received.

With particular reference to Fig. 6, it may be seen that the pin 58 is supported for reciprocable movement in the housing 15 and is normally biased to the right, as viewed in Fig. 6, by means of a compression spring 59. However, the pin 58 may be moved to the left, as viewed in Fig. 6, by means to be described, so as to impart clockwise movement to the latch arm 47 from the full line position of Fig. 6 to the dotted line position of Fig. 6, which movement is permitted by the universal pivot joint 48. In the full line position of the arm 47 in Fig. 6, the lug 55 will not engage the lug 38 on the cam element 31 during rotation of the latter. However, when the latch arm 47 is moved to the dotted line position of Fig. 6, the lugs 38 and 55 will come into abutting relation so as to restrain rotation of the cam element, or driven element, 31.

In order to obviate certain difficulties encountered with the crank length varying mechanism of the aforementioned application, Serial No. 221,048, now Patent No. 2,749,498, the present invention incorporates safety means for preventing inadvertent stalling of the electric motor 10 in the event that the motor should fail to be deenergized after the wiper blades have been moved to the parked position. These safety means are incorporated in the latch arm 47, which, as hereinbefore described, is capable of pivotal movement about the pivot point 48 in the plane of the drawings shown in Figs. 2 through 4. In order to park the wiper blades, the pin 58 is moved to the dotted line position of Figures 6 and 7 thereby moving the latch arm 47 into the path of movement of the lug 38. Under these conditions, the lug 38 will engage the surface 55 of the latch arm at a predetermined angular position of the cam element 31 so as to arrest rotation thereof. In particular, it should be noted that when the surfaces of the lugs 38 and 55 are in abutment, as shown in Fig. 4, a predetermined angular relationship exists between a line intersecting the axis of the shaft 22 and the point 70 on the latch arm 47, as viewed in Fig. 4, and a line intersecting the axis of pivot point 48 and point 70. This angular relationship, preferably approximately 95°, is chosen so that if the motor 10 should fail to stop, or be deenergized by the switch means to be described, the lug 38, acting upon the surface of the lug 55, will cam the latch arm 47 outwardly and effect clockwise pivotal movement of the latch arm 47 about pivot point 48 to the dotted line position, as shown in Fig. 4. The lug 38 will cam the latch arm 47 outwardly due to continued rotation of the crank arm 28 after engagement of the crank pin 29 with the end 33 of the slot 30 in the cam element 31. Under these conditions, rotation of the driven element 31 will no longer be restrained and, accordingly, any damage which might otherwise occur to the motor will be prevented.

With particular reference to Figs. 6 and 7, the housing 15 also encloses a manually operable switch mechanism for controlling energization of the motor, as well as for controlling the operative condition of the motion converting mechanism. In particular, the switch mechanism, designated generally by the numeral 80, includes a reciprocable plunger 81, the end 82 of which is arranged to engage a leaf spring actuator 83. One end 84 of the leaf spring actuator is attached to the switch housing and the free end 85 is arranged to cooperate with the reciprocable pin 58. Thus, when the plunger 81 is moved to the parked position, the free end 85 of the leaf spring actuator 83 will effect outward movement of the pin 58, as seen in Figs. 6 and 7, so as to move the latch arm 47 into alignment with the driven element 31.

With reference to Fig. 5, it may be seen that the shaft 60, or driven member, is supported by bearing means 75 and 76 within the housing 15. One end of the shaft 60 extends into the switch chamber of the housing 15 and has attached thereto an arm 77, which carries a pin 78 at the free end thereof. The pin 78 is arranged to engage the movable contact 90 of a single pole, double throw, snap action switch 100. However, the pin 78 only engages the movable contact 90 when the amplitude of oscillation imparted to the shaft 60 is a maximum and the blades are in the parked position.

With particular reference to Fig. 8, the electrical circuit connections for energizing the motor 10 will be described. As alluded to hereinbefore, the energizing circuit for the motor is of the type disclosed in the aforementioned copending application, Serial No. 418,503. Thus, the motor 10 is shown including an armature 14, a shunt field winding 13 and a series field winding 12. The field windings and armature are suitably connected through a thermal overload protector 11 to a source of D. C. voltage 110, which may constitute a motor vehicle battery. One end of the armature 14, the shunt field 13 and the series field 12 are connected to a conductor 115, which is connected with a stationary contact 91 of the parking switch 100. The other side of the armature 14 is connected by a conductor 116 with a stationary contact 86 of the manually operable switch 80.

The other end of the shunt field 13 is connected to a second stationary contact 87 of the switch 80. The manually operable switch 80 also includes stationary contacts 88, 89 and 95. The plunger 81, shown in Fig. 6, is connected to the movable switch contact, or bridging member, 96. Stationary contacts 87 and 88 are interconnected through a speed controlling resistor 97. Stationary contact 89 is connected to ground as is stationary contact 92 of the parking switch 100. Stationary contact 95 is connected to movable contact 90 of the parking switch.

*Operation*

The actuating mechanism of this invention operates as follows. When the operator positions the switch plunger 81 in the low speed position through a suitable Bowden wire connection from the driver's seat of the vehicle, the motor 10 will be energized. thereby imparting rotation to the shaft 18 and the worm gear 21. For the present, it will be assumed that the torsion spring is in an unwound position whereupon the crank pin 29 will be in the end 34 of the slot 30, as shown in Fig. 2. Accordingly, rotation of the worm gear 21 will impart rotation to the crank arm 28, the crank arm at this time having a minimum length so that oscillation will be imparted to the driven shaft 60 and the wiper blades through suitable linkage throughout the angle A in Fig. 1. Moreover, this oscillatory movement will be of a harmonic, or sinusoidal, character. If the operator desires to increase the speed of wiping, he need only move the plunger 81 to the high speed position.

When it is desired to park the wiper blades and interrupt operation thereof, the operator need only move the switch plunger 81 to the "park" position whereupon the following events will transpire. Initial movement of the plunger 81 to the parked position will deflect the spring actuator 83 so as to effect movement of the latch arm 47 into alignment with the driven element 31. Movement of the plunger 81 to the "park"

position will also open the circuit connections to the motor 10 through the switch 80. However, the circuit connections are completed by parking switch 100 through the closed contacts 92 and 90, so that the motor will continue to be energized. When the driven element 31 reaches an angular position, as shown in Fig. 3, the lugs 38 and 55 will come into abutting relation thereby winding up the torsion spring 32. By restraining rotation of the driven element 31, the crank pin 29 will move from the end 34 of the slot 30 to the end 33 thereof, as shown in Fig. 4, thereby increasing the length of the crank arm by effecting outward radial sliding movement thereof. In this manner, the amplitude of oscillation imparted to the shaft 60 and the wiper blades will be increased so as to move the blades throughout the angle $A+B$ to the parked position. Concurrently with movement of the blades to the parked position, the arm 77 will be moved to the position wherein the pin 78 will engage the snap action contact 90, thereby moving the contact 90 from the position, shown in Fig. 8, to a position where it engages contact 91. In this manner, the motor will be concurrently deenergized and a self-generative dynamic braking circuit therefor will be completed so as to instantaneously arrest rotation of the armature 14.

To resume wiper operation, it is only necessary to move the switch plunger 81 from the parked position to either the low, or high, positions thereof, whereupon the spring actuator 83 will move to the full line position, as shown in Fig. 6, thereby permitting movement of the pin 58 and the latch arm 47 to the full line position of Fig. 6. Inasmuch as movement of the latch arm 47 releases the torsion spring 32, it will unwind, to effect movement of the driven element 31 relative to the shaft 22 so as to reposition the crank pin 29 in the end 34 of the slot 30, thereby automatically reducing the crank arm length to a minimum and establishing the running position of the actuating mechanism.

While the embodiment of the present invention as herein disclosed, constitutes a preferred form, it is to be understood that other forms might be adopted.

What is claimed is as follows:

1. Windshield wiper actuating mechanism including, a rotatable driving member, a link having one end operatively connected to said driving member whereby said link is moved between predetermined limit positions during rotation of said driving member, an oscillatable driven member having a rocker arm attached thereto, and a pair of crossed links pivoted to said link at longitudinally spaced points and pivoted to said rocker arm on opposite sides of the axis of said driven member for imparting oscillation thereto upon rotation of said driving member.

2. Windshield wiper actuating mechanism including, a rotatable driving member, a crank arm connected to revolve with said driving member, a connecting rod pivotally connected at one end to said crank arm so as to have imparted thereto swinging movement between predetermined limit positions during rotation of said crank arm, an oscillatable driven member, and a pair of crossed links pivoted to said connecting rod and said driven member for imparting oscillation to said driven member upon swinging movement of said connecting rod.

3. Windshield wiper actuating mechanism including, a rotatable driving member, a driving element connected to said driving member and movable between predetermined limit positions, an oscillatable driven shaft, a member secured to said shaft, and connecting means interconnecting spaced points on said driving element and spaced points on said member on opposite sides of the axis of the shaft for imparting oscillation to said shaft upon movement of said driving element.

4. The combination set forth in claim 3 wherein said driving element comprises a connecting rod which has imparted thereto swinging movement, and wherein said spaced points on said member are located unequal distances from the axis of said shaft.

5. Windshield wiper actuating mechanism including, a rotatable driving member, a rotatable driven element yieldably coupled to said driving member, a wiper actuating driven member, a rocker arm attached to said driven member, a pair of crossed links having their outer ends pivotally connected to said rocker arm on opposite sides of the axis of the driven member, a connecting rod, the inner ends of said links being pivotally connected to said connecting rod at longitudinally spaced points, means interconnecting said connecting rod and said driving member including a variable throw crank, and means whereby effecting relative rotation between said yieldably coupled driven element and said driving member about the axis of the driving member varies the throw of said crank.

6. Windshield wiper actuating mechanism including, a rotatable driving member, a driven element rotatably journalled on and yieldably coupled to said driving member, a wiper actuating driven member, a rocker arm attached to said driven member, a pair of crossed links having their outer ends pivotally connected to said rocker arm on opposite sides of the axis of the driven member, a connecting rod, the inner ends of said links being pivotally connected to said connecting rod at longitudinally spaced points, means interconnecting the connecting rod and the driving member including a variable throw crank, means whereby stopping rotation of said yieldably coupled driven element varies the throw of said crank, and means for arresting movement of the driving member when the throw of said crank is a maximum.

7. Windshield wiper actuating mechanism including, a rotatable driving member, a wiper actuating driven member, means interconnecting said driving and driven members including, an element yieldably coupled to the driving member, a variable throw crank connected to revolve with the driving member but adapted for radial movement relative thereto, lost motion means interconnecting said element and said crank, a connecting rod pivoted to said crank and a pair of crossed links having their inner ends pivotally connected to said connecting rod at longitudinally spaced points and their outer ends operatively connected with said driven member on opposite sides of the axis of said driven member, and means including said lost motion means whereby stopping rotation of said element varies the throw of said crank.

8. Mechanism for actuating a windshield wiper including in combination, a rotatable shaft, a crank connected to revolve with said shaft but adapted for radial movement relative thereto, a connecting rod pivotally attached to said crank, a wiper actuating shaft, a rocker arm connected to said wiper actuating shaft, a pair of crossed links having their inner ends pivoted to said connecting rod and their outer ends pivoted to said rocker arm for interconnecting said connecting rod and said wiper actuating shaft, an element rotatably journalled on and yieldably coupled to the first mentioned shaft, lost motion mechanism interconnecting the first mentioned shaft and said element including a pin and cam surface, said cam surface being of varying radial distance from the axis of said element, said pin being attached to said crank, and means for effecting relative movement between said element and said first mentioned shaft so as to vary the radial position of said pin to vary the throw of said crank.

9. Windshield wiper actuating mechanism including, a rotatable driving member, a driven element rotatably journalled on and yieldably coupled to said driving member, a wiper actuating driven member, means interconnecting said driving and driven members including a variable throw crank, a pivotally mounted latch arm operable to stop rotation of said yieldably coupled driven element to vary the throw of said crank, means engageable with said latch arm for moving it into the path of movement of said yieldably coupled driven element comprising a reciprocable pin, and resilient means normally maintaining said latch arm in a retracted position.

References Cited in the file of this patent

UNITED STATES PATENTS

| | | |
|---|---|---|
| 2,307,204 | Ehrlich | Jan. 5, 1943 |
| 2,308,212 | Scott-Iversen | Jan. 12, 1943 |
| 2,491,697 | Vischulis | Dec. 20, 1949 |
| 2,513,247 | Morton | June 27, 1950 |

FOREIGN PATENTS

| | | |
|---|---|---|
| 13,521 | Netherlands | Sept. 15, 1925 |
| 873,802 | Germany | Apr. 16, 1953 |
| 909,896 | Germany | Apr. 26, 1954 |